US006697833B2

(12) United States Patent
Krygowski et al.

(10) Patent No.: US 6,697,833 B2
(45) Date of Patent: Feb. 24, 2004

(54) FLOATING-POINT MULTIPLIER FOR DE-NORMALIZED INPUTS

(75) Inventors: Christopher A. Krygowski, Lagrangeville, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 09/764,646

(22) Filed: Jan. 18, 2001

(65) Prior Publication Data

US 2002/0124037 A1 Sep. 5, 2002

(51) Int. Cl.$^7$ ............................................. G06F 7/44
(52) U.S. Cl. ...................................................... 708/503
(58) Field of Search ................................ 708/495, 501, 708/503

(56) References Cited

U.S. PATENT DOCUMENTS

| | | | | |
|---|---|---|---|---|
| 5,150,320 A | * | 9/1992 | Nakayama | 708/503 |
| 5,347,481 A | * | 9/1994 | Williams | 708/503 |
| 5,880,983 A | | 3/1999 | Elliott et al. | |
| 5,999,960 A | | 12/1999 | Gerwig et al. | |
| 6,099,158 A | * | 8/2000 | Gorshtein et al. | 708/503 |
| 6,446,104 B1 | * | 9/2002 | Tzeng et al. | 708/503 |

OTHER PUBLICATIONS

IEEE Standard for Binary Floating–Point Arithmetic, The Institute of Electrical and Electronics Engineers, Inc., 1985.

* cited by examiner

Primary Examiner—Tan V. Mai
(74) Attorney, Agent, or Firm—Lynn Augspurger; Cantor Colburn LLP

(57) ABSTRACT

A method is disclosed for efficiently multiplying de-normalized floating-point numbers without necessarily incurring additional delay over the multiplication of normalized numbers, wherein the de-normalized numbers are initially assumed to be normalized. The method includes providing multiplier and multiplicand floating-point numbers, each defining a fraction and an exponent; encoding the multiplier fraction; multiplexing the multiplier fraction; and multiplying the multiplier fraction by the multiplicand fraction to form a first set of partial products. The method further includes detecting a zero-value multiplier exponent characteristic indicative of de-normalization; computing a last partial product according to the value of the multiplier exponent characteristic; detecting a zero-value multiplicand exponent characteristic indicative of de-normalization; selecting a de-normalized multiplicand correction term according to the detected multiplicand exponent characteristic and the value of the multiplier fraction; and adding each of the first set and the last partial products to the de-normalized multiplicand correction term to form a final product.

7 Claims, 3 Drawing Sheets

FLOATING-POINT MULTIPLIER FOR DE-NORMALIZED INPUTS

BACKGROUND OF THE INVENTION

This disclosure relates to high speed implementation of floating-point multiplication with floating-point multipliers using the IEEE-754 binary floating-point standard, and in particular, to the handling of de-normalized input operands.

The "IEEE-754 Standard for Binary Floating-point Arithmetic" specifies a floating-point data architecture that is commonly implemented in computer hardware such as floating-point processors having multipliers. The format consists of a sign, a characteristic, and a mantissa. The sign bit is a single bit and is represented by an "S". The characteristic, represented by a "C", is 8 bits long for single format and 11 bits long for double format. The mantissa is 24 bits long for single format and 53 bits long for double format. The most significant bit of the mantissa is implied from the value of the characteristic. The lesser significant bits of the mantissa or fraction are represented by "F" in equations (1) and (2) that follow. If the characteristic "C" is not equal to zero, including where it has all bits set to one, then the value of the floating-point number is given by the following equation:

$$(-1)S \times (1).F \times 2^{(C-Bias)} \quad (1)$$

Numbers within this range are called normalized numbers and they have an implied one at the beginning of the mantissa. Numbers outside this range are considered to be special numbers. There are four types of special numbers defined in the IEEE-754 Standard. Three of these special numbers are handled easily by the hardware since their value dictates the resultant value with little or no arithmetic computation. These three special numbers are zero, infinity and not-a-number ("NaN"). The fourth type of special number is a de-normalized number that is indicated by a characteristic equal to zero and a non-zero fraction. The value of the fourth special number is given by the following equation:

$$(-1)S \times (0).F \times 2^{(1-Bias)} \quad (2)$$

In contrast with the normalized format, there is no implied one preceding the fraction in this de-normalized format. In order to determine that the data is de-normalized, the characteristic must be examined. This is important since the computation that is performed by the hardware is typically serially gated by the predetermination of de-normalized input data that will contribute to the cycle time of the hardware, as in the case of multiplication. The handling of de-normalized input data is a particular problem for floating-point processors that do not have any pre-decoded information that an operand is de-normalized, particularly where the assumption is that an input operand is normalized.

There is an additional problem in correcting the product for de-normalized input operands since one operand, the multiplier, is typically Booth scanned and the other, the multiplicand, is typically multiplexed to create partial products to be summed. Post-multiplication correction that adds to the delay of the multiplication process is undesirable. In some floating-point systems, de-normalized input operands cause a trap which allows software to implement them. In other systems the input data is predetermined to be de-normalized, so there is no critical path in performing the correction.

In typical floating-point systems, register and memory ("RX") format instructions must be implemented at high speed, and there is no time remaining in the cycle prior to execution, which comprises the fetch of the operand from memory, in order to check for de-normalized operands. Accordingly, a solution to handle de-normalized input data is desired that does not adversely impact the performance of the multiplier.

SUMMARY OF THE INVENTION

A method is disclosed for efficiently multiplying de-normalized floating-point numbers without necessarily incurring additional delay over the multiplication of normalized numbers, wherein the de-normalized numbers are initially assumed to be normalized. The method includes providing multiplier and multiplicand floating-point numbers, each defining a fraction and an exponent; encoding the multiplier fraction; multiplexing the multiplier fraction; and multiplying the multiplier fraction by the multiplicand fraction to form a first set of partial products. The method further includes detecting a zero-value multiplier exponent characteristic indicative of de-normalization; computing a last partial product according to the value of the multiplier exponent characteristic; detecting a zero-value multiplicand exponent characteristic indicative of de-normalization; selecting a de-normalized multiplicand correction term according to the detected multiplicand exponent characteristic and the value of the multiplier fraction; and adding each of the first set and the last partial products to the de-normalized multiplicand correction term to form a final product.

DESCRIPTION OF THE DRAWINGS

The present disclosure will be better understood, and its numerous features and advantages will become apparent to those skilled in the pertinent art by referencing the accompanying drawing, in which.

DETAILED DESCRIPTION OF THE INVENTION

Figure 1:
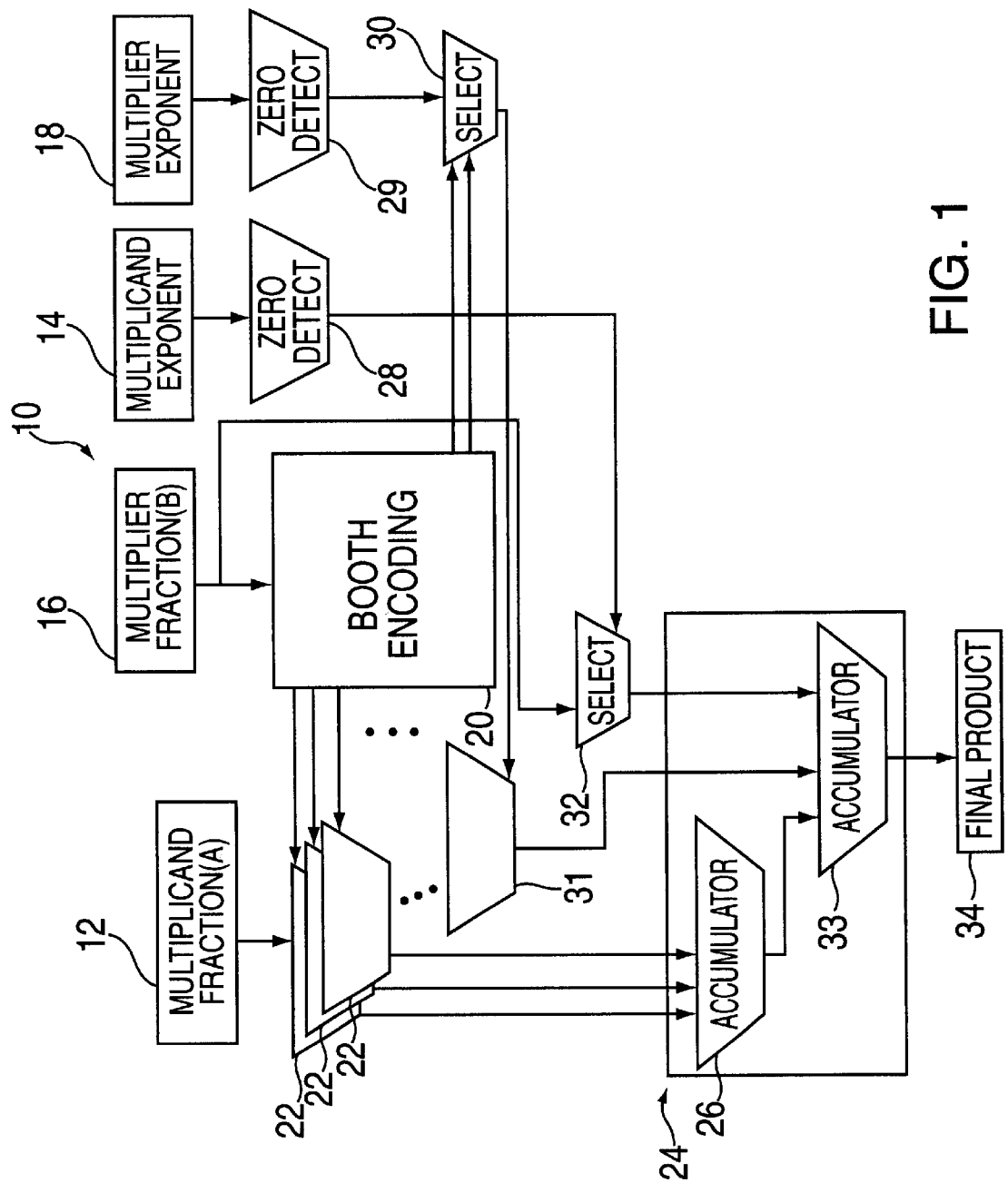
FIG. 1 is a block diagram of an overview of the data-flow through a floating-point multiplier.

FIG. 1 provides an overview of the data-flow through a floating point multiplier that supports both normalized and de-normalized data formats.

As shown in FIG. 1, the data-flow through the multiplier is indicated generally by the reference numeral 10. A multiplicand fraction is received at register 12 and the multiplicand exponent is received at register 14. A multiplier fraction is received at register 16 and the multiplier exponent is received at register 18. A Booth encoder 20 encodes the multiplier fraction of register 16, and multiplexes the Booth encoded multiplier fraction with the multiplicand fraction from register 12 to form partial products 22. The partial products 22 are received by the partial product accumulation unit 24. The accumulation unit 24 has a first accumulator 26 that sums all of the partial products 22.

The multiplicand exponent is read from register 14 by the zero-detection block 28, and the multiplier exponent is read from register 18 by the zero-detection block 29. A de-normalized correction-control selector 32 receives the multiplier fraction from register 16 and the output of the multiplicand exponent zero detection block 28 to thereby produce a de-normalized multiplicand correction term. A selector 30 receives the output of the multiplier exponent zero detection block 29 and selects between two outputs from the Booth Encoding block 20. The two outputs each represent the Booth encode of the most significant bits of the multiplier fraction, the first assuming a normalized multiplier and the second assuming a de-normalized multiplier. Selector 31 receives the output of selector 30 to form the bitwise most significant Booth encoded partial product. The output of selector 31 is read into accumulator 33. The de-normalized multiplicand correction term is added to accumulator 33. Accumulator 33 is the final accumulator of the partial product accumulation unit 24, and thus adds the accumulated total of the Booth multiplexed partial products computed by accumulator 26 to the de-normalized multiplicand correction term from selector 32 and the output of selector 31. The output of accumulator 33 becomes available in register 34 and represents the final multiplication product of the multiplicand and multiplier, corrected for de-normalized inputs.

In operation, the characteristic is examined in order to determine that the data is de-normalized. This translates to performing a logical NOR function on all of the bits of the characteristic. This function is accomplished by zero-detection blocks 28 and 29 for the multiplicand and multiplier, respectively. The computation that is performed by the hardware zero-detection blocks 28 and 29 that determines if there is de-normalized input data does not serially gate the Booth encoder 20 or the Booth multiplexed partial products 22, which would otherwise contribute to the cycle time of the hardware.

In the hardware implementation of the multiplication computation that is performed by the Booth encoder 20 using a Booth algorithm, the multiplier is scanned to create multiples of the multiplicand. These are then accumulated in the counter tree or partial product accumulation unit 24. The multiplicand is assumed to be normalized and an additional correction term is added to the partial product, according to embodiments of the disclosure. The following shows the calculation of this correction term:

The value of two N-bit binary numbers, A(0:N) and B(0:N), can be represented as:

$$A(0:N) = \sum_{i}^{N} a_i(2^{-i}) \quad (3)$$

$$B(0:N) = \sum_{j}^{N} b_j(2^{-j}) \quad (4)$$

The correction term is defined in the following equations. The multiplication of two N-bit mantissas, A and B, can be represented as:

$$P = A \times B = \sum_{i=0}^{N} a_i(2^{-i}) \sum_{j=0}^{N} b_j(2^{-j}) \quad (5)$$

$$= \sum_{i=0}^{N} \sum_{j=0}^{N} a_i b_j (2^{-(i+j)}) \quad (6)$$

If mantissa A is de-normalized then $a_0$ should have been equal to zero instead of one. So, the following needs to be done:

$$P = \sum_{i=1}^{N} \sum_{j=0}^{N} a_i b_j (2^{-(i+j)}) + a_0 \sum_{j=0}^{N} b_j (2^{(-j)}) \quad (7)$$

$$P = \sum_{i=1}^{N} \sum_{j=0}^{N} a_i b_j (2^{-(i+j)}) + a_0 \times B = \sum_{i=1}^{N} \sum_{j=0}^{N} a_i b_j (2^{-(i+j)}) \quad (8)$$

If it is assumed that A is normalized then $a_0=1$ rather than 0:

$$P' = \sum_{i=1}^{N} \sum_{j=0}^{N} a_i b_j (2^{-(i+j)}) + a_0 \times B \quad (9)$$

$$= \sum_{i=1}^{N} \sum_{j=0}^{N} a_i b_j (2^{-(i+j)}) + 1 \times B$$

$$P = P' - B \quad (10)$$

Therefore, the correction term is $-B$, where B is the multiplier. This correction term is treated as the last partial product in the partial product accumulation unit 24. Depending on the total number of partial products, this additional partial product does not necessarily introduce any additional delay.

Figure 2:
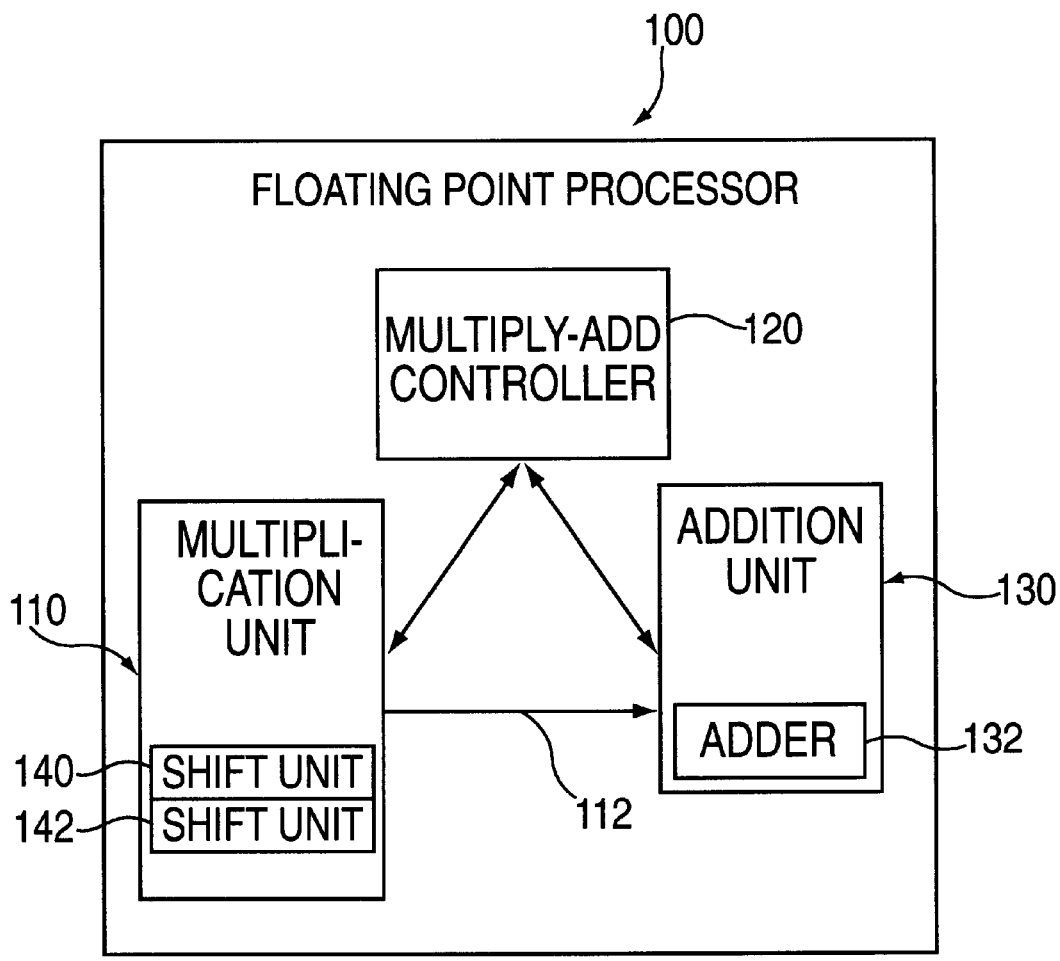
FIG. 2 is a block diagram of an exemplary floating point processor.

In an alternate embodiment shown in FIG. 2, a floating-point processor 100 has a multiply unit 110, a multiply-add controller 120, and an add unit 130. The multiply-add controller 120 is used to perform the functions of the Booth encoder 20 by determining shift values for shifting both the de-normalized result of the multiplication operation and the operand to be added thereto within a pair of shift units 140 and 142, so that both are aligned with respect to their corresponding digits and with respect to the data width of an adder 132 or the add unit 130. The floating-point processor 100 employs the pair of shift units 140 and 142, and the adder 132 of the add unit 130 supports at least the same data width, double data width for example, as the de-normalized result of the multiplication operation. A further increase of the data width results in a further improvement of the processor 100, particularly with respect to processing speed. This allows the processor 100 to execute multiply-add sequences without incurring any wait cycles where the source and target data widths are equal.

A feedback path 112 from the multiplier unit 110 to the add unit 130 is also provided. One clock cycle is normally not enough time to normalize and align the result of the multiplication before an addition using the result of that multiplication in the add unit 130 can be carried out. The result of the multiplication is therefore preferably block-normalized, the second operand of the add instruction is pre-aligned, and preferably a double width add unit 130 is used.

Figure 3:
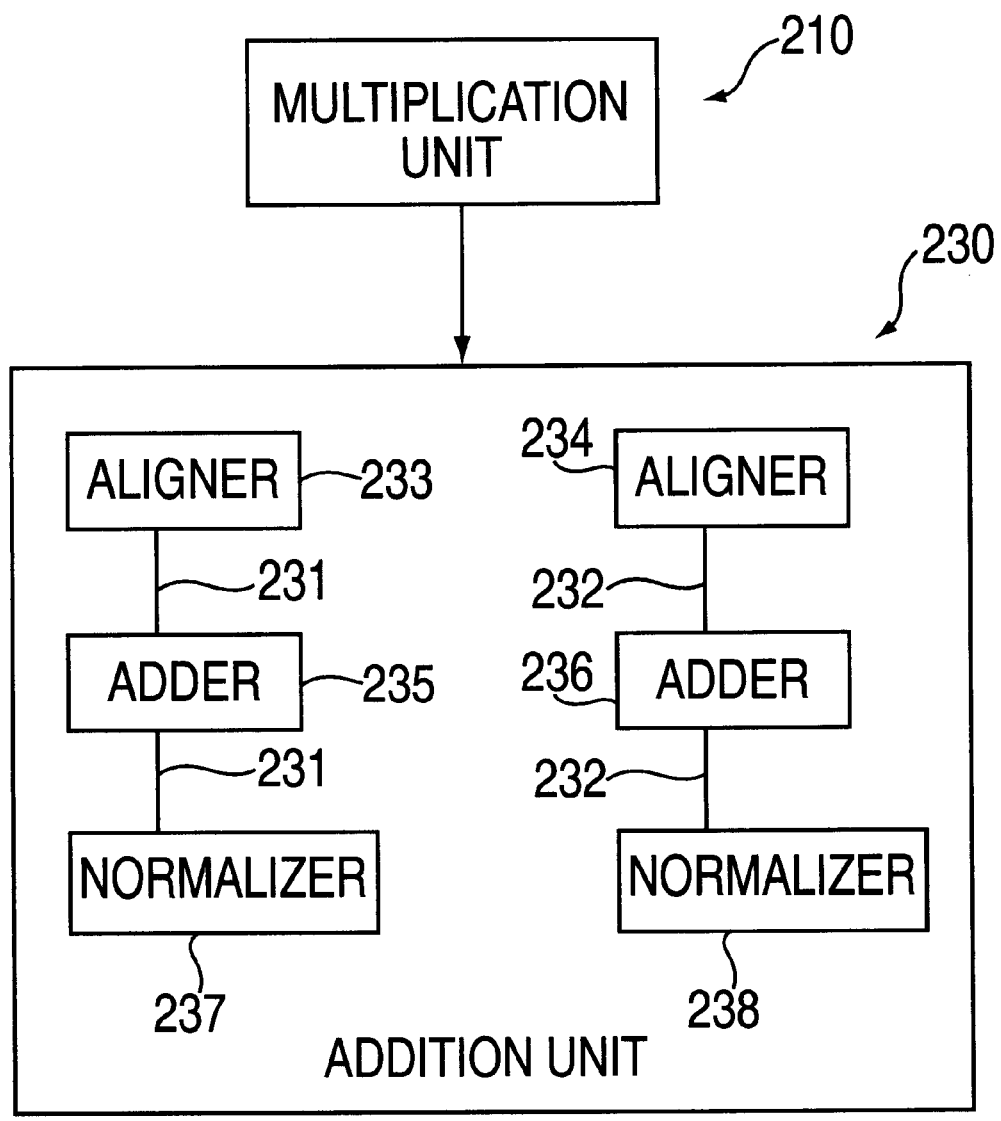
FIG. 3 is a block diagram of an exemplary multiplication unit and addition unit.

In another alternate embodiment shown in FIG. 3, a multiplier unit 210 and an add unit 230 provide an infinite precision split multiply and add operation having increased speed. The multiplier unit 210 multiplies a first portion of a plurality of operands to provide a product. The add unit 230 combines the product and a remaining portion of the plurality of operands. The add unit 230 comprises at least one pair of data paths. Each pair of data paths comprises a first data path 231 and a second data path 232. The first data path 231 comprises a first aligner 233, a first adder 235, and a first normalizer 237 capable of shifting a mantissa by a fewer number of bits than the aligner 233. The second data path 232 comprises a second aligner 234, a second adder 236, and a second normalizer 238 capable of shifting a mantissa by a larger number orbits than the aligner 234.

An advantage of the above-described embodiments is that they do not gate the multiplication process with the de-normalized input data check, thus reducing delay. As taught by these embodiments, if it is assumed that the multiplicand is normalized and correction is made for any incorrect assumption through a correction term that is accumulated with the other partial products, then the detection of a de-normalized multiplier can be overlapped with the accumulation of the partial products such that its processing time does not extend the total time for completion of the floating-point multiplication operation.

Thus, another advantage is that the detection of a de-normalized multiplier operand is overlapped with other computations, since it only affects the last Booth decoding of the most significant partial product and its resulting summation.

An additional advantage is that although the detection of a de-normalized multiplicand would affect all partial products and is not possible prior to creating at least some of the partial products, the multiplicand is assumed to be normalized and an additional correction term is added to the partial product.

While exemplary embodiments have been shown and described, various modifications and substitutions may be made thereto without departing from the spirit and scope of the disclosure. Accordingly, it is to be understood that the present disclosure has been described by way of illustration only, and such illustrations and embodiments as have been disclosed herein are not to be construed as limiting to the claims.

What is claimed is:

1. A method of multiplying a plurality of floating-point numbers, comprising:

providing multiplier and multiplicand floating-point numbers, each defining a fraction and an exponent;

encoding the provided multiplier fraction;

multiplexing the encoded multiplier fraction;

multiplying the multiplexed multiplier fraction by the multiplicand fraction to form a first set of partial products;

detecting a multiplier exponent characteristic indicative of de-normalization;

computing a last partial product according to a value of the detected multiplier exponent characteristic;

detecting a multiplicand exponent characteristic indicative of de-normalization;

selecting a de-normalized multiplicand correction term according to the detected multiplicand exponent characteristic and a value of the multiplier fraction; and adding each of the first set and the last partial products to the de-normalized multiplicand correction term to form a final product.

2. The method of claim 1 wherein detecting the multiplier exponent characteristic is accomplished within the time required to form the first set of partial products.

3. The method of claim 2 wherein computing the last partial product is accomplished within the time required to form the first set of partial products.

4. The method of claim 1 wherein detecting the multiplicand exponent characteristic is accomplished within the time required to form and accumulate the first set and the last partial products.

5. The method of claim 4 wherein selecting the corresponding de-normalized multiplicand correction term is accomplished within the time required to form and accumulate the first set and the last partial products.

6. A method of multiplying a floating-point multiplicand number and a floating-point multiplier number, comprising:

receiving floating-point multiplicand and floating-point multiplier numbers, each defining a fraction and an exponent;

assuming that the multiplicand and multiplier numbers are normalized;

encoding the multiplier number;

calculating a first set of partial products of the encoded multiplier number and the multiplicand;

detecting a de-normalized multiplier;

overlapping the detection of the de-normalized multiplier with the calculation of the first set of partial products to reduce the delay of processing;

producing a last partial product corresponding to the detected de-normalized multiplier;

detecting a de-normalized multiplicand;

correcting for the de-normalized multiplicand by calculating a correction term;

overlapping the calculation of the correction term with the calculation of the first set and the last partial products and the accumulation of the first set of partial products;

accumulating a result of the first set and the last partial products and the correction term to form a final product.

7. A method of processing multiplication instructions for binary floating-point operands in a floating-point processor, comprising:

obtaining a multiplicand operand having a multiplicand characteristic;

obtaining a multiplier operand having a multiplier characteristic;

multiplying the multiplicand operand and the multiplier operand by scanning the multiplier operand to create multiples of the multiplicand operand and accumulating the multiples in a partial product accumulation unit;

determining a value of the multiplier characteristic of the multiplier operand and normalizing the multiplier operand, when the multiplier operand is de-normalized, concurrently with the scanning of the multiplier operand; and adding a correction term to the partial product accumulation unit.

* * * * *